(12) United States Patent
Liu

(10) Patent No.: US 11,122,451 B2
(45) Date of Patent: Sep. 14, 2021

(54) MOBILITY MEASUREMENT METHOD AND DEVICE, AND COMPUTER-READABLE STORAGE MEDIUM

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 133 days.

(21) Appl. No.: 16/679,095

(22) Filed: Nov. 8, 2019

(65) Prior Publication Data

US 2020/0077286 A1    Mar. 5, 2020

Related U.S. Application Data

(63) Continuation of application No. PCT/CN2017/086208, filed on May 26, 2017.

(51) Int. Cl.
*H04W 24/08* (2009.01)
*H04L 5/00* (2006.01)
(Continued)

(52) U.S. Cl.
CPC ........... *H04W 24/08* (2013.01); *H04L 5/0048* (2013.01); *H04W 8/02* (2013.01); *H04W 36/0061* (2013.01); *H04W 56/001* (2013.01)

(58) Field of Classification Search
CPC ......... H04W 36/0007; H04W 36/0033; H04W 36/0055; H04W 36/0083; H04W 36/02;
(Continued)

(56) References Cited

U.S. PATENT DOCUMENTS

| 2009/0268704 | A1* | 10/2009 | Kim | H04B 7/264 370/342 |
| 2013/0010723 | A1* | 1/2013 | Ouchi | H04W 52/346 370/329 |

(Continued)

FOREIGN PATENT DOCUMENTS

| CN | 102780532 A | 11/2012 |
| CN | 103220066 A | 7/2013 |

(Continued)

OTHER PUBLICATIONS

U.S. Appl. No. 16/679,095, 2016 (Year: 2016).*
(Continued)

*Primary Examiner* — Ian N Moore
*Assistant Examiner* — Sun Jong Kim
(74) *Attorney, Agent, or Firm* — Syncoda LLC; Feng Ma

(57) ABSTRACT

A mobility measurement method includes: receiving, from a first base station, system information including information of a first reference signal configured by the first base station for a current cell that is a cell accessed currently, and information of a second reference signal configured by a second base station for a neighboring cell of the current cell, the first and second base stations corresponding respectively to the current cell and the neighboring cell; and measuring mobility of the current cell based on a reference signal in a synchronization block of the current cell and the first reference signal according to the information of the first reference signal, and measuring mobility of the neighbor cell based on a reference signal in a synchronization block of the neighbor cell and the second reference signal according to the information of the second reference signal.

16 Claims, 4 Drawing Sheets

(51) Int. Cl.
*H04W 8/02* (2009.01)
*H04W 36/00* (2009.01)
*H04W 56/00* (2009.01)

(58) Field of Classification Search
CPC ... H04W 36/08; H04W 36/18; H04W 36/385; H04W 4/80; H04W 76/12; H04W 4/70; H04W 4/08; H04W 4/021; H04W 72/121; H04W 72/048; H04W 36/14
See application file for complete search history.

(56) References Cited

U.S. PATENT DOCUMENTS

| | | | |
|---|---|---|---|
| 2014/0247748 | A1 | 9/2014 | Kang et al. |
| 2017/0033906 | A1 | 2/2017 | Siomina et al. |
| 2017/0034725 | A1 | 2/2017 | Negishi et al. |
| 2017/0237590 | A1* | 8/2017 | Zhang ............... H04L 1/06 370/330 |
| 2017/0318490 | A1* | 11/2017 | Yang ............ H04L 5/0048 |
| 2017/0359733 | A1* | 12/2017 | Yamazaki .......... H04B 17/15 |
| 2018/0007688 | A1* | 1/2018 | Fu ..................... H04L 5/14 |
| 2019/0090218 | A1* | 3/2019 | Noh ................ H04L 5/0062 |
| 2020/0084678 | A1* | 3/2020 | Gunnarsson .... H04W 36/00837 |

FOREIGN PATENT DOCUMENTS

| | | |
|---|---|---|
| CN | 103298017 A | 9/2013 |
| CN | 103379556 A | 10/2013 |
| EP | 3122116 A1 | 1/2017 |
| WO | 2014106317 A1 | 7/2014 |

OTHER PUBLICATIONS

First office action of Chinese application No. 201780000377.9 dated Aug. 4, 2020.

International search report of PCT application No. PCT/CN2017/086208 dated Feb. 26, 2018.

Extended European search report of counterpart EP application No. 17911243.8 dated Feb. 13, 2020.

ZTE:"Discussion on cell identification in NR", 3GPP Draft; R4-1705178 Discussion on Cell Identification in NR, 3rd Generation Partnership Project (3GPPL Mobile Competence Centre ; 650, Route Des Lucioles ; F-06921 Sophia-Antipolis Cedex ; France, vol. RAN WG4, no. Hangzhou, China; May 15, 2017-May 19, 2017, May 14, 2017 (May 14, 2017), paragraph [02.1]-paragraph [02.2].

Ericsson: "Measurements based on CSI -RS for L3 mobility", 3GPP Draft; RI-1709186 Mobility Measurements Based on CSI RS, 3rd Generation Partnership Project (3GPP), Mobile Competence Centre; 650, Route Des Lucioles; F-06921 Sophia-Antipolis Ced Ex ; France, vol. RAN WG1, no. Hangzhou, China; May 15, 2017-May 19, 2017, May 14, 2017 (May 14, 2017), paragraph [02.1]-paragraph [02.3].

Nokia et al: "DL signals and mobility measurements in NR", 3GPP Draft; R4-1701808, 3rd Generation Partnership Project (3GPP), Mobile Competence Centre ; 650, Route Des Lucioles ; F-06921 Sophia-Antipolis Cedex ; France, vol. RAN WG4, no. Athens, Greece; Feb. 13, 2017-Feb. 17, 2017, Feb. 12, 2017 (Feb. 12, 2017), paragraph [02.1]-paragraph [2.2.x].

LG Electronics: "Discussion on RRM measurement in NR", 3GPP Draft; RI-1704870 Downlink Based Measurement, 3rd Generation Partnership Project (3GPP), Mobile Competence Centre; 650, Route Des Lucioles ; F-06921 Sophia-Antipolis Ced Ex ; France vol. RAN WG1, no. Spokane, USA; Apr. 3, 2017-Apr. 7, 2017; Apr. 2, 2017 (Apr. 2, 2017); paragraph [02.1]-paragraph [02.2].

"3rd Generation Partnership Project; Technical Specification Group Radio Access Network; Study on New Radio Access Technology Physical Layer Aspects (Release 14)", 3GPP Standard ; Technical Report; 3GPP TR 38.802, 3rd Generation Partnership Project (3GPPL Mobile Competence Centre ; 650, Route Des Lucioles ; F-06921 Sophia-Antipolis Cedex ; France, vol. RAN WG1 no. VI4.0.0, Mar. 25, 2017 (Mar. 25, 2017), pp. 1-143; paragraph [6.3.2.1]-paragraph [6.3.2.2].

* cited by examiner

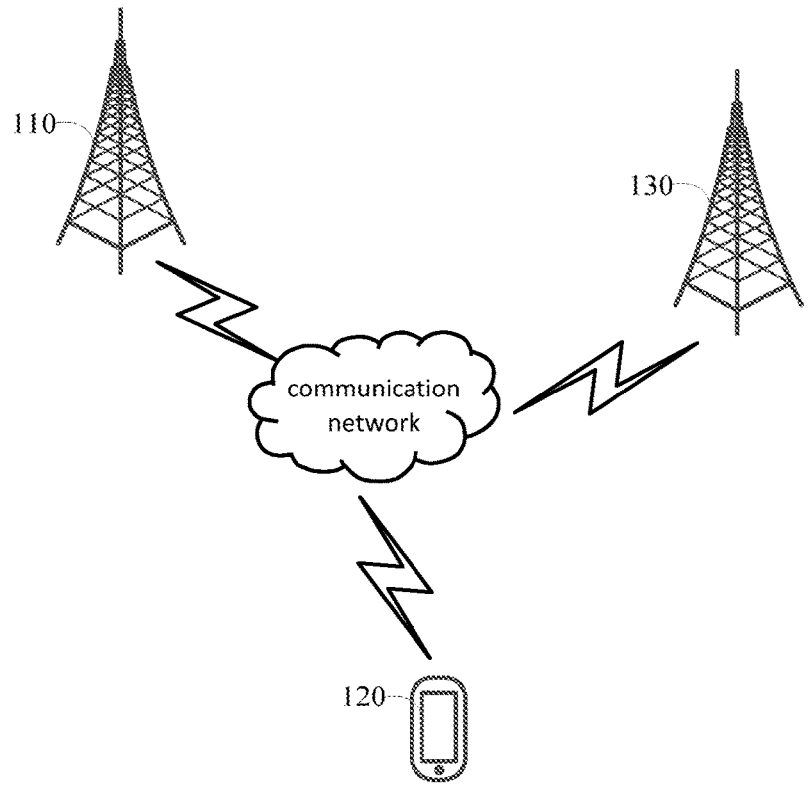

FIG. 1A system information sent by a first base station is received, wherein the system information includes information of a first reference signal and information of a second reference signal; the first reference signal is a reference signal configured by the first base station for a current cell; the current cell is a cell currently accessed by a user equipment; the second reference signal is a reference signal configured by a second base station for a neighbor cell of the current cell; the first base station is a base station corresponding to the current cell; and the second base station is a base station corresponding to the neighbor cell — 101 mobility of the current cell is measured based on a reference signal in a synchronization block of the current cell and the first reference signal according to the information of the first reference signal; and mobility of the neighbor cell is measured based on a reference signal in a synchronization block of the neighbor cell and the second reference signal according to the information of the second reference signal — 102

FIG. 1B

MOBILITY MEASUREMENT METHOD AND DEVICE, AND COMPUTER-READABLE STORAGE MEDIUM

CROSS-REFERENCE TO RELATED APPLICATION

This is a continuation of International Application No: PCT/CN2017/086208 filed on May 26, 2017, the disclosure of which is hereby incorporated by reference in its entirety.

BACKGROUND

The 5G (Fifth Generation) network has emerged with the rapid development of the mobile communication technology, enabling UE (User Equipment) accessed thereto to realize communication. However, the UE may move in the 5G network in an actual application scenario. Thus, for ensuring the access continuity, a base station instructs the UE to select/reselect a cell in a moving process of the UE. Therefore, in order to successfully realize cell selection/reselection, the UE may perform mobility measurement.

SUMMARY

The present disclosure relates generally to the field of communication technologies, and more specifically to a mobility measurement method and device, and a computer-readable storage medium.

Various embodiments of the present disclosure provide a mobility measurement method and device, and a computer-readable storage medium.

In a first aspect, there is provided a mobility measurement method, including:

receiving system information from a first base station, wherein the system information comprises information of a first reference signal and information of a second reference signal, the first reference signal is a reference signal configured by the first base station for a current cell, the current cell is a cell accessed currently, the second reference signal is a reference signal configured by a second base station for a neighbor cell of the current cell, the first base station is a base station corresponding to the current cell, and the second base station is a base station corresponding to the neighbor cell; and measuring mobility of the current cell based on a reference signal in a synchronization block of the current cell and the first reference signal according to the information of the first reference signal, and measuring mobility of the neighbor cell based on a reference signal in a synchronization block of the neighbor cell and the second reference signal according to the information of the second reference signal.

In some embodiments, the information of the first reference signal includes first initial position information, first end position information and a first density number, the first initial position information is configured to determine an initial position of the first reference signal on a time frequency of the current cell, the first end position information is configured to determine an end position of the first reference signal on the time frequency of the current cell, and the first density number is configured to determine a density of the first reference signal on the time frequency of the current cell; and the information of the second reference signal includes second initial position information, second end position information and a second density number, the second initial position information is configured to determine an initial position of the second reference signal on a time frequency of the neighbor cell, the second end position information is configured to determine an end position of the second reference signal on the time frequency of the neighbor cell, and the second density number is configured to determine a density of the second reference signal on the time frequency of the neighbor cell.

In some embodiments, the information of the first reference signal includes a first format number configured to determine a distribution format of the first reference signal on the time frequency of the current cell; and the information of the second reference signal includes a second format number configured to determine a distribution format of the second reference signal on the time frequency of the neighbor cell.

In some embodiments, the measuring mobility of the current cell based on a reference signal in a synchronization block of the current cell and the first reference signal according to the information of the first reference signal, and measuring mobility of the neighbor cell based on a reference signal in a synchronization block of the neighbor cell and the second reference signal according to the information of the second reference signal, include:

obtaining a first measurement result and a second measurement result by measuring mobility of the reference signal in the synchronization block of the current cell and mobility of the first reference signal respectively according to the information of the first reference signal; and obtaining a third measurement result and a fourth measurement result by measuring mobility of the reference signal in the synchronization block of the neighbor cell and mobility of the second reference signal respectively according to the information of the second reference signal; and obtaining a mobility measurement result of the current cell by performing moving average processing on the first measurement result and the second measurement result, and obtaining a mobility measurement result of the neighbor cell by performing moving average processing on the third measurement result and the fourth measurement result.

In some embodiments, after measuring mobility of the current cell based on a reference signal in a synchronization block of the current cell and the first reference signal according to the information of the first reference signal, the method further includes:

in a case that the system information further includes an update message of the current cell and the update message includes a first update time and information of an updated first reference signal, when the first update time is reached, measuring the mobility of the current cell based on the reference signal in the synchronization block of the current cell and the updated first reference signal according to the information of the updated first reference signal;

performing moving average processing on a mobility measurement result determined within a first preset time period prior to and close to the first update time and a mobility measurement result determined when the first update time is reached; and determining a result obtained after the moving average processing as the mobility measurement result of the current cell.

In some embodiments, after measuring the mobility of the neighbor cell based on the reference signal in the synchronization block of the neighbor cell and the second reference signal according to the information of the second reference signal, the method further includes:

in a case that the system information further includes an update message of the neighbor cell and the update message includes a second update time and information of an updated second reference signal, when the second update time is reached, measuring the mobility of the neighbor cell based on the reference signal in the synchronization block of the neighbor cell and the updated second reference signal according to the information of the updated second reference signal;

performing moving average processing on a mobility measurement result determined within a second preset time period prior to and close to the second update time and a mobility measurement result determined when the second update time is reached; and determining a result obtained after the moving average processing as the mobility measurement result of the neighbor cell.

In a second aspect, there is provided a mobility measurement device, including:

a receiving module, configured to receive system information from a first base station, wherein the system information includes information of a first reference signal and information of a second reference signal, the first reference signal is a reference signal configured by the first base station for a current cell, the current cell is a cell accessed currently, the second reference signal is a reference signal configured by a second base station for a neighbor cell of the current cell, the first base station is a base station corresponding to the current cell, and the second base station is a base station corresponding to the neighbor cell; and a first measuring module, configured to measure mobility of the current cell based on a reference signal in a synchronization block of the current cell and the first reference signal according to the information of the first reference signal, and measuring mobility of the neighbor cell based on a reference signal in a synchronization block of the neighbor cell and the second reference signal according to the information of the second reference signal.

In some embodiments, the information of the first reference signal includes first initial position information, first end position information and a first density number, the first initial position information is configured to determine an initial position of the first reference signal on a time frequency of the current cell, the first end position information is configured to determine an end position of the first reference signal on the time frequency of the current cell, and the first density number is configured to determine a density of the first reference signal on the time frequency of the current cell; and the information of the second reference signal includes second initial position information, second end position information and a second density number, the second initial position information is configured to determine an initial position of the second reference signal on a time frequency of the neighbor cell, the second end position information is configured to determine an end position of the second reference signal on the time frequency of the neighbor cell, and the second density number is configured to determine a density of the second reference signal on the time frequency of the neighbor cell.

In some embodiments, the information of the first reference signal includes a first format number configured to determine a distribution format of the first reference signal on the time frequency of the current cell; and the information of the second reference signal includes a second format number configured to determine a distribution format of the second reference signal on the time frequency of the neighbor cell.

In some embodiments, wherein the first measuring module is configured to:

obtain a first measurement result and a second measurement result by measuring mobility of the reference signal in the synchronization block of the current cell and mobility of the first reference signal respectively according to the information of the first reference signal; and obtaining a third measurement result and a fourth measurement result by measuring mobility of the reference signal in the synchronization block of the neighbor cell and mobility of the second reference signal respectively according to the information of the second reference signal; and obtain a mobility measurement result of the current cell by performing moving average processing on the first measurement result and the second measurement result, and obtaining a mobility measurement result of the neighbor cell by performing moving average processing on the third measurement result and the fourth measurement result.

In some embodiments, the device further includes:

a second measuring module, configured to, in a case that the system information further includes an update message of the current cell and the update message includes a first update time and information of an updated first reference signal, when the first update time is reached, measure the mobility of the current cell based on the reference signal in the synchronization block of the current cell and the updated first reference signal according to the information of the updated first reference signal;

a first processing module, configured to perform moving average processing on a mobility measurement result determined within a first preset time period prior to and close to the first update time and a mobility measurement result determined when the first update time is reached; and a first determining module, configured to determine a result obtained after the moving average processing as the mobility measurement result of the current cell.

In some embodiments, the device further includes:

a third measuring module, configured to, in a case that the system information further includes an update message of the neighbor cell and the update message includes a second update time and information of an updated second reference signal, when the second update time is reached, measuring the mobility of the neighbor cell based on the reference signal in the synchronization block of the neighbor cell and the updated second reference signal according to the information of the updated second reference signal;

a second determining module, configured to perform moving average processing on a mobility measurement result determined within a second preset time period prior to and close to the second update time and a mobility measurement result determined when the second update time is reached; and a second determining module, configured to determine a result obtained after the moving average processing as the mobility measurement result of the neighbor cell.

In a third aspect, there is provided a mobility measurement device, including:

a processor; and a memory, configured to store instructions executable by the processor, wherein the processor is configured to perform the steps of the method of any of the first aspect.

In a fourth aspect, there is provided a non-transitory computer-readable storage medium, wherein instructions are stored on the computer-readable storage medium; and the steps of the method of any of the first aspect are implemented when the instructions are executed by a processor.

BRIEF DESCRIPTION OF THE DRAWINGS

In order to describe the technical solutions in the embodiments of the present more clearly, the following briefly introduces the accompanying drawings required for describing the embodiments. Apparently, the accompanying drawings in the following description show merely some embodiments of the present disclosure, and a person of ordinary skill in the art may also derive other drawings from these accompanying drawings without creative efforts.

FIG. 1A is a schematic diagram of an implementation environment according to an embodiment.

FIG. 1B is a flow chart of a mobility measurement method according to an embodiment.

DETAILED DESCRIPTION

Figure 2:
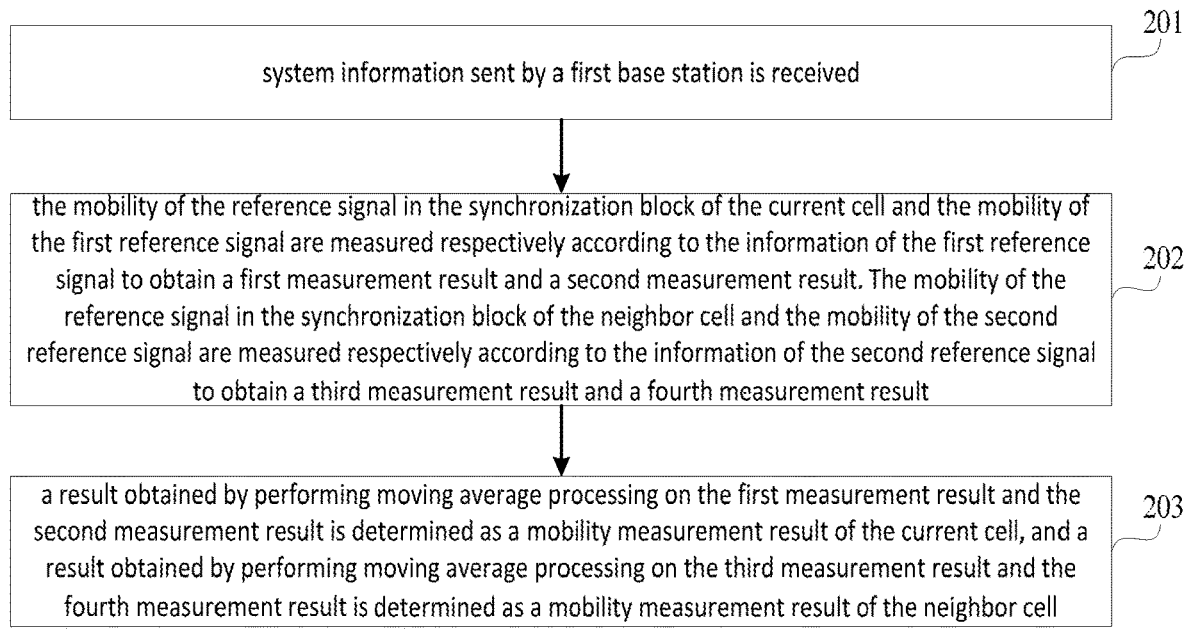
FIG. 2 is a flow chart of a mobility measurement method according to another embodiment.

The present disclosure will be described in further detail with reference to the accompanying drawings, to present the objects, technical solutions, and advantages of the present disclosure more clearly.

The terminology used herein is for the purpose of describing particular examples only and is not intended to be limiting of examples. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two functions or acts shown in succession may in fact be executed concurrently or may sometimes be executed in the reverse order, depending upon the functionality/acts involved.

The mobility measurement mainly refers to measurement of RSRP (Reference Signal Receiving Power) and/or RSRQ (Reference Signal Received Quality) by the UE based on reference signals of cells. In related arts, the UE performs mobility measurement based on a reference signal in a synchronization block of a current cell and a reference signal in a synchronization block of a neighbor cell, respectively, so as to obtain at least two measurement results. Then, the UE may report the at least two measurement results to the base station, so that the base station instructs the UE to select/reselect the cell according to the at least two measurement results.

First, prior to detailed introduction of the embodiments of the present disclosure, the nouns involved in the embodiments of the present disclosure are briefly introduced.

The synchronization block includes: system information, a reference signal, and the like. The base station may send a synchronization block to UE through a beam. That is, the base station sends the synchronization block to the scanned UE by a beam scanning manner. After the UE receives the synchronization block for its own direction, the reference signal and the system information may be acquired from the synchronization block.

A time frequency includes: a time domain and a frequency domain. The time domain refers to an occupied OFDM (Orthogonal Frequency Division Multiplexing) symbol, and the frequency domain refers to an occupied sub-carrier. According to the time domain and the frequency domain, the position of the reference signal on an RE (Resource Element) can be determined. That is, the position of the reference signal on the time frequency is equivalent to the position of the reference signal on the RE.

The RE is the smallest time frequency resource unit in the physical resource, and occupies one sub-carrier on the frequency domain and one OFDM symbol on the time domain.

Next, implementation environments involved in the embodiments of the present disclosure will be described.

Referring to FIG. 1A that is a schematic diagram of an implementation environment according to embodiments, in the implementation environment, a first base station 110, UE 120 and a second base station 130 are mainly included. The UE 120 can access the first base station 110 through a communication network, and the first base station 110 can be connected to the second base station 130 through the communication network.

The first base station 110 is mainly used to allocate a first reference signal to the UE 120, and send a synchronization block and system information to the UE 120 by means of beam scanning. The system information includes information of the first reference signal. In addition, the first base station 110 is further used to receive information, sent by the second base station 130, of a second reference signal allocated by the second base station 130, and send the information of the second reference signal to the UE 120 through the system information. That is, the system information further includes the information of the second reference signal allocated by the second base station 130.

As described above, the second base station 130 is used to allocate the second reference signal, and send the information of the second reference signal to the first base station 110 through an interface between the base stations, so as to enable the first base station 110 to send the information of the second reference signal to the UE 120.

The UE 120 is mainly used to implement the mobility measurement method provided by the embodiment of the present disclosure. A specific implementation process may refer to the embodiments shown in FIG. 1B and FIG. 2 below.

Because the mobility is measured only based on a reference signal in the synchronization block in the related arts, and the density of the reference signal in the synchronization block is usually lower, the measurement result may be inaccurate. Thus, the embodiments of the present disclosure provide a mobility measurement method. The implementation process of the mobility measurement method will be described in detail by the embodiments shown in FIG. 1B and FIG. 2, respectively.

FIG. 1B is a flow chart of a mobility measurement method according to an exemplary embodiment. In this embodiment, using UE to perform the mobility measurement method is taken as an example, and the mobility measurement method may include the following implementation steps.

In step 101, system information sent by a first base station is received, wherein the system information includes information of a first reference signal and information of a second reference signal; the first reference signal is a reference signal configured by the first base station for a current cell; the current cell is a cell currently accessed by a user equipment; the second reference signal is a reference signal configured by a second base station for a neighbor cell of the current cell; the first base station is a base station corresponding to the current cell; and the second base station is a base station corresponding to the neighbor cell.

In step 102, mobility of the current cell is measured based on a reference signal in a synchronization block of the current cell and the first reference signal according to the information of the first reference signal; and mobility of the neighbor cell is measured based on a reference signal in a synchronization block of the neighbor cell and the second reference signal according to the information of the second reference signal.

In the embodiment of the present disclosure, the system information sent by the first base station is received, wherein the system information includes the information of the reference signal configured by the first base station for the current cell and the information of the reference signal configured by the second base station for the neighbor cell of the current cell. The mobility of the current cell is measured based on the reference signal in the synchronization block of the current cell and the first reference signal according to the information of the first reference signal, so that a problem of inaccurate mobility measurement caused by lower density of the reference signal in the synchronization block of the current cell is avoided. In addition, similarly, the mobility of the neighbor cell is measured based on the reference signal in the synchronization block of the neighbor cell and the second reference signal according to the information of the second reference signal, so that a problem of inaccurate mobility measurement caused by lower density of the reference signal in the synchronization block of the neighbor cell is avoided. That is, the accuracy in the mobility measurement is improved according to the embodiments of the present disclosure.

In some embodiments, the information of the first reference signal includes first initial position information, first end position information and a first density number. The first initial position information is used to determine an initial position of the first reference signal on a time frequency of the current cell. The first end position information is used to determine an end position of the first reference signal on the time frequency of the current cell. The first density number is used to determine a density of the first reference signal on the time frequency of the current cell.

In some embodiments, the information of the second reference signal includes second initial position information, second end position information and a second density number. The second initial position information is used to determine an initial position of the second reference signal on a time frequency of the neighbor cell. The second end position information is used to determine an end position of the second reference signal on the time frequency of the neighbor cell. The second density number is used to determine a density of the second reference signal on the time frequency of the neighbor cell.

In some embodiments, the information of the first reference signal includes a first format number used to determine a distribution format of the first reference signal on the time frequency of the current cell. The information of the second reference signal includes a second format number used to determine a distribution format of the second reference signal on the time frequency of the neighbor cell.

In some embodiments, measuring the mobility of the current cell based on the reference signal in the synchronization block of the current cell and the first reference signal according to the information of the first reference signal and measuring the mobility of the neighbor cell based on the reference signal in the synchronization block of the neighbor cell and the second reference signal according to the information of the second reference signal include the following steps.

The mobility of the reference signal in the synchronization block of the current cell and the mobility of the first reference signal are measured respectively according to the information of the first reference signal to obtain a first measurement result and a second measurement result. The mobility of the reference signal in the synchronization block of the neighbor cell and the mobility of the second reference signal are measured respectively according to the information of the second reference signal to obtain a third measurement result and a fourth measurement result.

A result obtained by performing moving average processing on the first measurement result and the second measurement result is determined as a mobility measurement result of the current cell, and a result obtained by performing moving average processing on the third measurement result and the fourth measurement result is determined as a mobility measurement result of the neighbor cell.

In some embodiments, after measuring the mobility of the current cell based on the reference signal in the synchronization block of the current cell and the first reference signal according to the information of the first reference signal, the method further includes the following steps.

In a case that the system information further includes an update message of the current cell and the update message includes a first update time and information of an updated first reference signal, when the first update time is reached, the mobility of the current cell is measured based on the reference signal in the synchronization block of the current cell and the updated first reference signal according to the information of the updated first reference signal.

The moving average processing is performed on a mobility measurement result determined within a first preset time period prior to and close to the first update time and a mobility measurement result determined when the first update time is reached.

A result obtained after the moving average processing is determined as the mobility measurement result of the current cell.

In some embodiments, after measuring the mobility of the neighbor cell based on the reference signal in the synchronization block of the neighbor cell and the second reference signal according to the information of the second reference signal, the method further includes the following steps.

In a case that the system information further includes an update message of the neighbor cell and the update message includes a second update time and information of an updated second reference signal, when the second update time is reached, the mobility of the neighbor cell is measured based on the reference signal in the synchronization block of the neighbor cell and the updated second reference signal according to the information of the updated second reference signal.

The moving average processing is performed on a mobility measurement result determined within a second preset time period prior to and close to the second update time and a mobility measurement result determined when the second update time is reached.

A result obtained after the moving average processing is determined as the mobility measurement result of the neighbor cell.

All of the above optional technical solutions may form other optional embodiments of the present disclosure in an arbitrary combination thereof, and the description thereof will not be repeated herein.

FIG. 2 is a flow chart of a mobility measurement method according to another exemplary embodiment. In this embodiment, using UE to perform the mobility measurement method is taken as an example, and the mobility measurement method may include the following implementation steps.

In step 201, system information sent by a first base station is received.

In the embodiment of the present disclosure, the first base station configures a first reference signal for the UE, so that the UE performs mobility measurement based on the first reference signal except for a reference signal in a synchronization block of a current cell. In order to enable the UE to conveniently determine the position of the first reference signal, namely, to enable the UE to conveniently know where to acquire the first reference signal, the first base station needs to inform the UE of information of the first reference signal. In the embodiment of the present disclosure, the first base station informs the UE of the information of the first reference signal through the system information.

In a specific implementation, the first base station may send the system information to the UE by means of beam scanning; and correspondingly, the UE receives the system information sent by the first base station.

The system information includes the information of the first reference signal and information of a second reference signal. The first reference signal is a reference signal configured by the first base station for the current cell. The current cell is a cell currently accessed by a user equipment. The second reference signal is a reference signal configured by a second base station for a neighbor cell of the current cell. The first base station is a base station corresponding to the current cell. The second base station is a base station corresponding to the neighbor cell.

The information of the second reference signal may be sent by the second base station to the first base station through a communication interface between the base stations, and then sent by the first base station to the UE through the system information. That is, in an actual application scenario, in order to successfully select/reselect the cell, it is required to measure the mobility of the neighbor cell. Therefore, the system information includes the information of the second reference signal configured by the second base station for the neighbor cell except for the information of the first reference signal configured by the first base station.

It should be noted that, according to different actual configuration manners, contents in the information of the first reference signal are different from those in the information of the second reference signal. Specifically, situations are as follows.

In the first situation, the information of the first reference signal includes first initial position information, first end position information and a first density number. The first initial position information is used to determine an initial position of the first reference signal on a time frequency of the current cell. The first end position information is used to determine an end position of the first reference signal on the time frequency of the current cell. The first density number is used to determine a density of the first reference signal on the time frequency of the current cell. The information of the second reference signal includes second initial position information, second end position information and a second density number. The second initial position information is used to determine an initial position of the second reference signal on a time frequency of the neighbor cell. The second end position information is used to determine an end position of the second reference signal on the time frequency of the neighbor cell. The second density number is used to determine a density of the second reference signal on the time frequency of the neighbor cell.

Next, the first reference signal is taken as an example for illustration. Generally, the first base station may set the density of the first reference signal according to an actual operating environment. For example, the density may be involved in three cases. In a dense urban area, the density may be set to be larger in order to avoid interference. For example, the density of the first reference signal is set to one-half, in which case one of every two REs is the first reference signal. For another example, in a non-dense urban area, the density may be set to one-third, in which case one of every three REs is the first reference signal. Since the interference in an open area of a suburb is less, the density may be set to one-sixth, in which case one of every six REs is the first reference signal.

It should be noted that, in order to facilitate description and representation, the density number may be used to represent the density of the first reference signal. For example, a density number "00" may be used to represent a density of one-half, a density number "01" to represent a density of one-third, a density number "10" to represent a density of one-sixth, and the like. In an actual implementation, the first base station and the UE may pre-negotiate a corresponding relationship between the density numbers and the actual densities, so that the corresponding actual density can be determined according to the density number.

In order to determine the position of the first reference signal in the RE, the information of the first reference signal may include the first initial position information, second end position information and the first density number.

The initial position of the first reference signal on the time frequency can be determined according to the first initial position information. That is, the initial position of the first reference signal in the RE can be determined according to the first initial position information. The end position of the first reference signal on the time frequency can be determined according to the second end position information. That is, the end position of the first reference signal on the RE can be determined according to the second end position information. The density of the first reference signal on the time frequency can be determined according to the first density number. That is, the density of the first reference signal on the RE can be determined according to the first density number. In this way, distribution positions and distribution rule of the first reference signal in the RE can be determined, so that the position of the first reference signal in the RE of the current cell can be determined. That is, the position of the first reference signal in the time domain of the current cell is determined.

It should be noted that, in the first situation, the principles of contents included in the information of the second reference signal are similar to those included in the information of the first reference signal, so that the contents included in the information of the second reference signal will not be illustrated in detail herein.

In the second situation, the information of the first reference signal includes a first format number used to determine a distribution format of the first reference signal on the time frequency of the current cell. The information of the second reference signal includes a second format number used to determine a distribution format of the second reference signal on the time frequency of the neighbor cell.

Next, the first reference signal is taken as an example for illustration. In an actual implementation, the first base station and the UE may pre-negotiate a corresponding relationship between the first format numbers and actual formats, so that the UE may determine the distribution format of the first reference signal on the time frequency of the current cell according to the corresponding first format number. The distribution format directly represents the specific distribution position and distribution rule of the first reference signal on the time frequency of the current cell.

It should be noted that, in the second situation, the principles of contents included in the information of the second reference signal are similar to those included in the information of the first reference signal, so that the contents included in the information of the second reference signal will not be illustrated in detail herein.

In step 202, the mobility of the reference signal in the synchronization block of the current cell and the mobility of the first reference signal are measured respectively according to the information of the first reference signal to obtain a first measurement result and a second measurement result. The mobility of the reference signal in the synchronization block of the neighbor cell and the mobility of the second reference signal are measured respectively according to the information of the second reference signal to obtain a third measurement result and a fourth measurement result.

In a specific implementation, in order to enable the UE to conveniently measure the mobility of the reference signal in the synchronization block of the current cell and the first reference signal respectively, the time for the first base station to send the first reference signal should be synchronous with/close to the time to send the synchronization block of the current cell.

Similarly, in order to enable the UE to conveniently measure the mobility of the reference signal in the synchronization block of the neighbor cell and the second reference signal respectively, the time for the second base station to send the second reference signal should be synchronous with/close to the time to send the synchronization block of the neighbor cell.

In the embodiment of the present disclosure, for the current cell, the mobility is measured not only based on the reference signal in the synchronization block of the current cell, but also based on the first reference signal configured by the first base station. Thus, two measurement results, namely the first measurement result and the second measurement result, can be obtained.

Similarly, for the neighbor cell, the mobility is measured not only based on the reference signal in the synchronization block of the neighbor cell, but also based on the second reference signal configured by the second base station. Thus, two measurement results, namely the third measurement result and the fourth measurement result, can be obtained.

It should be noted that specific implementation processes of the mobility measurement of the reference signal in the synchronization block of the current cell and the first reference signal, as well as the mobility measurement of the reference signal in the synchronization block of the neighbor cell and the second reference signal may refer to the related arts, and are not limited by the embodiments of the present disclosure.

In step 203, a result obtained by performing moving average processing on the first measurement result and the second measurement result is determined as a mobility measurement result of the current cell, and a result obtained by performing moving average processing on the third measurement result and the fourth measurement result is determined as a mobility measurement result of the neighbor cell.

In the embodiment of the present disclosure, the result obtained by performing moving average processing on the first measurement result and the second measurement result is determined as the mobility measurement result of the current cell. Compared with a mobility measurement result obtained only based on the reference signal in the synchronization block of the current cell, the accuracy in the mobility measurement of the current cell is improved. Similarly, the result obtained by performing moving average processing on the third measurement result and the fourth measurement result is determined as the mobility measurement result of the neighbor cell. Compared with a mobility measurement result obtained only based on the reference signal in the synchronization block of the neighbor cell, the accuracy in the mobility measurement of the neighbor cell is improved.

It should be noted that the specific implementations of performing the moving average processing on the first measurement result and the second measurement result, as well as on the third measurement result and the fourth measurement result may refer to the related arts, and are not limited by the embodiments of the present disclosure.

In addition, in an actual application scenario, due to objective factors such as the environment, the configuration of the first reference signal may be changed by the first base station due to objective factors such as the environment, or the configuration of the second reference signal may be changed by the second base station. In this case, it is necessary to inform the UE of information of the changed first reference signal and/or information of the changed second reference signal. The specific implementations include the following possible implementations.

In the first situation, the configuration of the first reference signal is changed by the first base station.

In a case that the system information further includes an update message of the current cell and the update message includes a first update time and information of an updated first reference signal, when the first update time is reached, the mobility of the current cell is measured based on the reference signal in the synchronization block of the current cell and the updated first reference signal according to the information of the updated first reference signal. The moving average processing is performed on a mobility measurement result determined within a first preset time period prior to and close to the first update time and a mobility measurement result determined when the first update time is reached. The result obtained after the moving average processing is determined as the mobility measurement result of the current cell.

The first preset time period may be customized by a user according to an actual requirement, or may be defaulted by the UE, and is not limited by the embodiments of the disclosure.

In general, in order to achieve synchronization between the first base station and the UE, when the configuration of the first reference signal is changed by the first base station, the first base station generally instructs a time of measuring the mobility based on the updated first reference signal, namely, the first update time carried in the update message of the current cell. In addition, in order to inform the UE of the position of the updated first reference signal, the first base station also needs to inform the UE of the position of the updated first reference signal on the time frequency. That is, the update message also carries the information of the updated first reference signal.

For the UE, when the system information received by the UE includes the update message of the current cell, the UE acquires the first update time in the update message. When the first update time is reached, the UE acquires the updated first reference signal based on the information of the updated first reference signal, and performs the mobility measurement based on the reference signal in the synchronization block of the current cell and the updated first reference signal. That is, prior to the first update time, the UE still performs mobility measurement based on the reference signal in the synchronization block of the current cell and the unupdated first reference signal.

In the embodiment of the present disclosure, when the first update time is reached, the moving average processing is performed on a mobility measurement result determined within a time period prior to the first update time and a mobility measurement result determined when the first update time is reached. The result obtained after the moving average processing is determined as the mobility measurement result of the current cell. That is, the mobility measurement result determined prior to the first update time is still valid.

It should be noted that the above only takes the following implementation as an example: the moving average processing is performed on a mobility measurement result determined within the time period prior to the first update time and the mobility measurement result determined when the first update time is reached, and the result obtained after the moving average processing is determined as the mobility measurement result of the current cell. In another embodiment, the UE may further discard the mobility measurement result determined prior to the first update time. That is, the UE only determines the mobility measurement result determined when the first update time is reached as the mobility measurement result of the current cell, which will not be limited by the embodiments of the present disclosure.

In the second situation, the configuration of the second reference signal is changed by the second base station.

In a case that the system information further includes an update message of the neighbor cell and the update message includes a second update time and information of an updated second reference signal, when the second update time is reached, the mobility of the neighbor cell is measured based on the reference signal in the synchronization block of the neighbor cell and the updated second reference signal according to the information of the updated second reference signal. The moving average processing is performed on a mobility measurement result determined within a second preset time period prior to and close to the second update time and a mobility measurement result determined when the second update time is reached. The result obtained after the moving average processing is determined as the mobility measurement result of the neighbor cell.

The second preset time period may be customized by a user according to an actual requirement, or may be defaulted by the UE, and is not limited by the embodiments of the disclosure.

In general, in order to achieve synchronization between the second base station and the UE, when the configuration of the second reference signal is changed by the second base station, the second base station generally instructs a time of measuring the mobility based on the updated second reference signal, namely, the second update time carried in the update message of the neighbor cell. In addition, in order to inform the UE of the position of the updated second reference signal, the second base station also informs the UE of the position of the updated second reference signal on the time frequency through the first base station. That is, the system information sent by the first base station includes the update message of the neighbor cell, and update message further carries the information of the updated second reference signal.

For the UE, when the system information received by the UE includes the update message of the neighbor cell, the UE acquires the second update time in the update message. When the second update time is reached, the UE acquires the updated second reference signal based on the information of the updated second reference signal, and performs the mobility measurement based on the reference signal in the synchronization block of the neighbor cell and the updated second reference signal. That is, prior to the second update time, the UE still performs mobility measurement based on the reference signal in the synchronization block of the neighbor cell and the un-updated second reference signal.

In the embodiment of the present disclosure, when the second update time is reached, the moving average processing is performed on a mobility measurement result determined within a time period prior to the second update time and a mobility measurement result determined when the second update time is reached. The result obtained after the moving average processing is determined as the mobility measurement result of the neighbor cell. That is, the mobility measurement result determined prior to the second update time is still valid.

It should be noted that the above only takes the following implementation as an example: the moving average processing is performed on the mobility measurement result determined within the time period prior to the second update time and the mobility measurement result determined when the second update time is reached, and the result obtained after the moving average processing is determined as the mobility measurement result of the neighbor cell. In another embodiment, the UE may further discard the mobility measurement result determined prior to the second update time. That is, the UE only determines the mobility measurement result determined when the second update time is reached as the mobility measurement result of the neighbor cell, which will not be limited by the embodiments of the present disclosure.

It should be noted that, as described above, when the configuration of the first reference signal is changed by the first base station, the first base station informs the UE of the current cell of the first update time and the information of the updated first reference signal. In addition, the first base station further informs the UE of the neighbor cell of the first update time and the information of the updated first reference signal. Similarly, when the configuration of the second reference signal is changed by the second base station, the second base station informs the UE of the current cell of the second update time and the information of the updated second reference signal. In addition, the second base station further informs the UE of the neighbor cell of the second update time and the information of the updated second reference signal, wherein this neighbor cell is managed by the second base station.

Moreover, it should be noted that the above only takes the following as an example: the configuration of the first reference signal is changed by the first base station, or the configuration of the second reference signal is changed by the second base station. In another embodiment, it is also possible that the configuration of the first reference signal is changed by the first base station, and the configuration of the second reference signal is changed by the second base station. In this case, the system information may include both the update message of the current cell and the update message of the neighbor cell. Here, the UE measures the mobility of the current cell based on the reference signal in the synchronization block of the current cell and the updated first reference signal, and measures the mobility of the neighbor cell based on the reference signal in the synchronization block of the neighbor cell and the updated second reference signal. The specific implementation processes may refer to the first and second situations, and are not described in detail herein.

In the embodiment of the present disclosure, the system information sent by the first base station is received, wherein the system information includes the information of the reference signal configured by the first base station for the current cell and the information of the reference signal configured by the second base station for the neighbor cell of the current cell. The mobility of the current cell is measured based on the reference signal in the synchronization block of the current cell and the first reference signal according to the information of the first reference signal, so that a problem of inaccurate mobility measurement caused by lower density of the reference signal in the synchronization block of the current cell is avoided. In addition, similarly, the mobility of the neighbor cell is measured based on the reference signal in the synchronization block of the neighbor cell and the second reference signal according to the information of the second reference signal, so that a problem of inaccurate mobility measurement caused by lower density of the reference signal in the synchronization block of the neighbor cell is avoided. That is, the accuracy in the mobility measurement is improved according to the embodiments of the present disclosure.

Figure 3A:
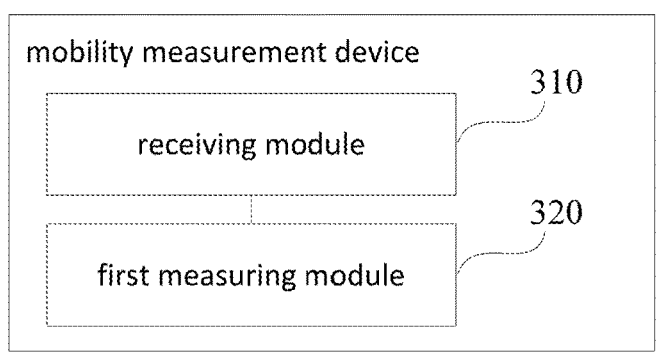
FIG. 3A is a schematic structural diagram of a mobility measurement device according to an embodiment.

FIG. 3A is a schematic structural diagram of a mobility measurement device according to an exemplary embodiment. The mobility measurement device may be implemented by software, hardware, or a combination of both, and includes the following modules.

A receiving module 310 is used to receive system information sent by a first base station. The system information includes information of a first reference signal and information of a second reference signal. The first reference signal is a reference signal configured by the first base station for a current cell. The current cell is a cell currently accessed by a user equipment. The second reference signal is a reference signal configured by a second base station for a neighbor cell of the current cell. The first base station is a base station corresponding to the current cell. The second base station is a base station corresponding to the neighbor cell.

A first measuring module 320 is used to measure mobility of the current cell based on a reference signal in a synchronization block of the current cell and the first reference signal according to the information of the first reference signal, and measure mobility of the neighbor cell based on a reference signal in a synchronization block of the neighbor cell and the second reference signal according to the information of the second reference signal.

The various device components, units, blocks, or portions may have modular configurations, or are composed of discrete components, but nonetheless can be referred to as "modules" in general. In other words, the "components," "modules" or "units" referred to herein may or may not be in modular forms.

In some embodiments, the information of the first reference signal includes first initial position information, first end position information and a first density number. The first initial position information is used to determine an initial position of the first reference signal on a time frequency of the current cell. The first end position information is used to determine an end position of the first reference signal on the time frequency of the current cell. The first density number is used to determine a density of the first reference signal on the time frequency of the current cell.

The information of the second reference signal includes second initial position information, second end position information and a second density number. The second initial position information is used to determine an initial position of the second reference signal on a time frequency of the neighbor cell. The second end position information is used to determine an end position of the second reference signal on the time frequency of the neighbor cell. The second density number is used to determine a density of the second reference signal on the time frequency of the neighbor cell.

In some embodiments, the information of the first reference signal includes a first format number used to determine a distribution format of the first reference signal on the time frequency of the current cell. The information of the second reference signal includes a second format number used to determine a distribution format of the second reference signal on the time frequency of the neighbor cell.

In some embodiments, the first measuring module 320 is used to:

measure the mobility of the reference signal in the synchronization block of the current cell and the mobility of the first reference signal respectively according to the information of the first reference signal to obtain a first measurement result and a second measurement result, and measure the mobility of the reference signal in the synchronization block of the neighbor cell and the mobility of the second reference signal respectively according to the information of the second reference signal to obtain a third measurement result and a fourth measurement result; and determine a result obtained by performing moving average processing on the first measurement result and the second measurement result as a mobility measurement result of the current cell, and determine a result obtained by performing moving average processing on the third measurement result and the fourth measurement result as a mobility measurement result of the neighbor cell.

Figure 3B:
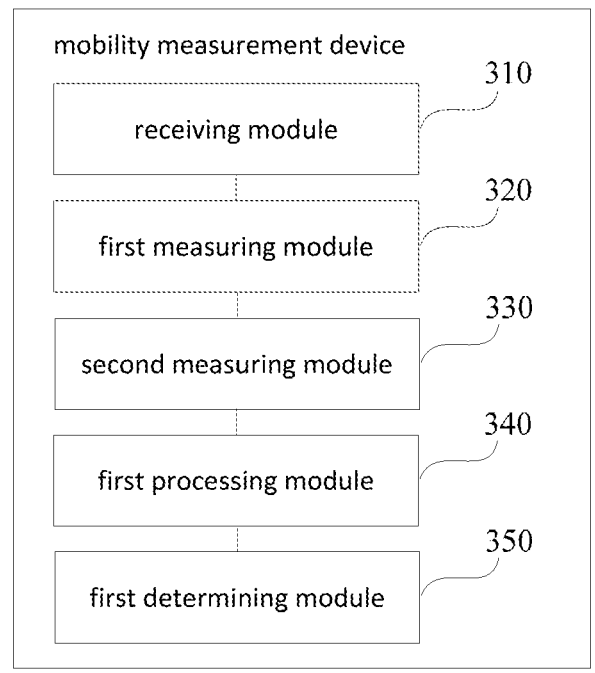
FIG. 3B is a schematic structural diagram of a mobility measurement device according to another embodiment.
Figure 3C:
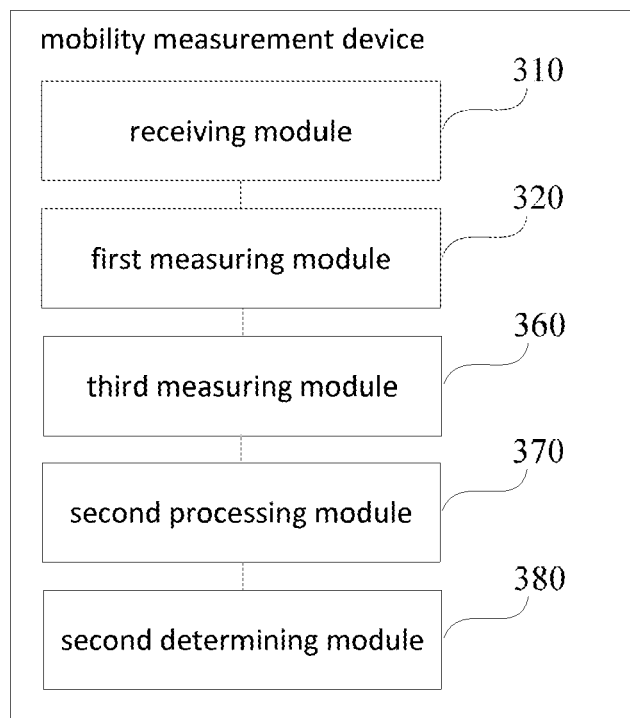
FIG. 3C is a schematic structural diagram of a mobility measurement device according to yet another embodiment.

In some embodiments, referring to FIG. 3B, the device further includes the following modules.

A second measuring module 330 is used to, in a case that the system information further includes an update message of the current cell and the update message includes a first update time and information of an updated first reference signal, when the first update time is reached, measure the mobility of the current cell based on the reference signal in the synchronization block of the current cell and the updated first reference signal according to the information of the updated first reference signal.

A first processing module 340 is used to perform moving average processing on a mobility measurement result determined within a first preset time period prior to and close to the first update time and a mobility measurement result determined when the first update time is reached.

A first determining module 350 is used to determine a result obtained after the moving average processing as the mobility measurement result of the current cell.

In some embodiments, referring to FIG. 3B, the device further includes the following modules.

A third measuring module 360 is used to, in a case that the system information further includes an update message of the neighbor cell and the update message includes a second update time and information of an updated second reference signal, when the second update time is reached, measure the mobility of the neighbor cell based on the reference signal in the synchronization block of the neighbor cell and the updated second reference signal according to the information of the updated second reference signal.

A second processing module 370 is used to perform moving average processing on a mobility measurement result determined within a second preset time period prior to and close to the second update time and a mobility measurement result determined when the second update time is reached.

A second determining module 380 is used to determine a result obtained after the moving average processing as the mobility measurement result of the neighbor cell.

In the embodiment of the present disclosure, the system information sent by the first base station is received, wherein the system information includes the information of the reference signal configured by the first base station for the current cell and the information of the reference signal configured by the second base station for the neighbor cell of the current cell. The mobility of the current cell is measured based on the reference signal in the synchronization block of the current cell and the first reference signal according to the information of the first reference signal, so that a problem of inaccurate mobility measurement caused by lower density of the reference signal in the synchronization block of the current cell is avoided. In addition, similarly, the mobility of the neighbor cell is measured based on the reference signal in the synchronization block of the neighbor cell and the second reference signal according to the information of the second reference signal, so that a problem of inaccurate mobility measurement caused by lower density of the reference signal in the synchronization block of the neighbor cell is avoided. That is, the accuracy in the mobility measurement is improved according to the embodiments of the present disclosure.

Figure 4:
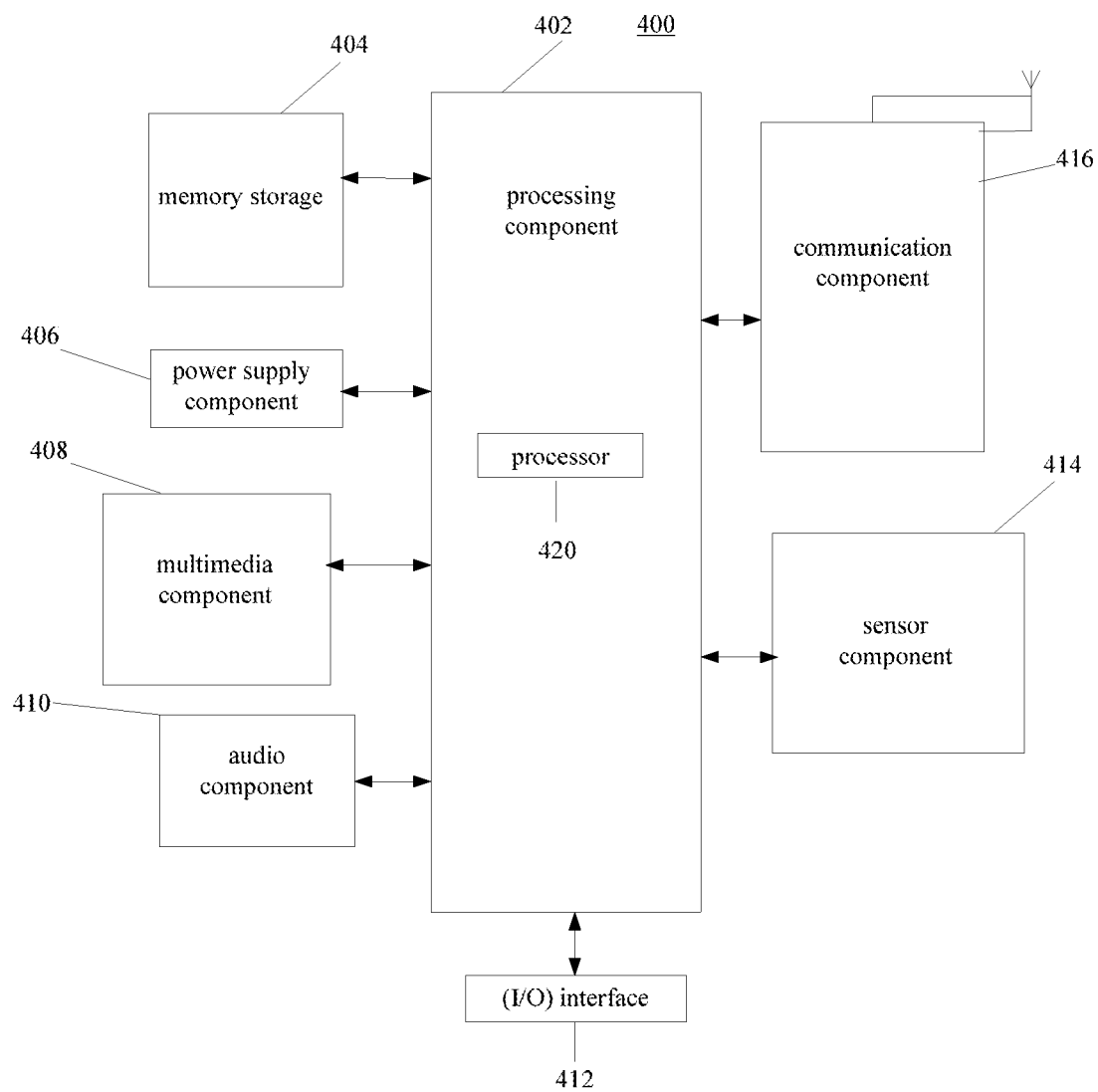
FIG. 4 is a block diagram of a mobility measurement device 400 according to an embodiment.

FIG. 4 is a block diagram of a mobility measurement device 400 according to an exemplary embodiment. Fox example, the device 400 may be a mobile phone, a computer, a digital broadcast terminal, a message transceiver, a game console, tablet equipment, medical equipment, fitness equipment, a personal digital assistant or the like.

Referring to FIG. 4, the device 400 may include one or more following components: a processing component 402, a memory 404, a power component 406, a multimedia component 408, an audio component 410, an input/output (I/O) interface 412, a sensor component 414 and a communication component 416.

The processing component 402 typically controls overall operations of the device 400, such as the operations associated with display, telephone calls, data communications, camera operations and recording operations. The processing component 402 may include one or more processors 420 to execute instructions to realize all or part of the steps in the above described methods. Moreover, the processing component 402 may include one or more modules which facilitate the interaction between the processing component 402 and other components. For example, the processing component 402 may include a multimedia module to facilitate the interaction between the multimedia component 408 and the processing component 402.

The memory 404 is configured to store various types of data to support the operations of the device 400. Examples of such data include instructions for any applications or methods operated on the device 400, contact data, phonebook data, messages, pictures, video, etc. The memory 404 may be implemented by using any type of volatile or non-volatile memory equipment, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power supply component 406 provides power to various components of the device 400. The power supply component 406 may include a power supply management system, one or more power sources, and any other components associated with the generation, management, and distribution of power in the device 400.

The multimedia component 408 includes a screen providing an output interface between the device 400 and the user. In some embodiments, the screen may include a liquid crystal display (LCD) and a touch panel (TP). In some embodiments, the screen can be other types of displays, such as organic light-emitting diode (OLED) displays.

In a case that the screen includes the touch panel, the screen may be implemented as a touch screen to receive input signals from the user. The touch panel includes one or more touch sensors to sense touches, swipes and gestures on the touch panel. The touch sensors may not only sense a boundary of a touch or swipe action, but also sense a period of time and a pressure associated with a touch or swipe action. In some embodiments, the multimedia component 408 includes a front camera and/or a rear camera. The front camera and/or the rear camera may receive an external multimedia datum while the device 400 is in an operation mode, such as a photographing mode or a video mode. Each of the front and rear cameras may be a fixed optical lens system or have a focus and optical zoom capability.

The audio component 410 is configured to output and/or input audio signals.

For example, the audio component 410 includes a microphone (MIC) configured to receive an external audio signal when the device 400 is in an operation mode, such as a call mode, a recording mode, and a voice recognition mode. The received audio signal may be further stored in the memory 404 or transmitted via the communication component 416. In some embodiments, the audio component 410 further includes a speaker used to output audio signals.

The I/O interface 412 provides an interface between the processing component 402 and peripheral interface modules, such as a keyboard, a click wheel, buttons, and the like. The buttons may include, but are not limited to, a home button, a volume button, a starting button, and a locking button.

The sensor component 414 includes one or more sensors to provide status assessments of various aspects of the device 400. For instance, the sensor component 414 may detect an open/closed status of the device 400, relative positioning of components, e.g., the display and the keypad, of the device 400, a change in position of the device 400 or a component of the device 400, a presence or absence of user's contact with the device 400, an orientation or an acceleration/deceleration of the device 400, and a change in temperature of the device 400. The sensor component 414 may include a proximity sensor configured to detect the presence of nearby objects without any physical contact. The sensor component 414 may also include a light sensor, such as a CMOS or CCD image sensor, for use in imaging applications. In some embodiments, the sensor component 414 may also include an accelerometer sensor, a gyroscope sensor, a magnetic sensor, a pressure sensor or a temperature sensor.

The communication component 416 is configured to facilitate wired or wireless communication between the device 400 and other equipment. The device 400 can access a wireless network based on a communication standard, such as WiFi, 2G, or 3G, or a combination thereof. In one exemplary embodiment, the communication component 416 receives a broadcast signal or broadcast associated information from an external broadcast management system via a broadcast channel. In one exemplary embodiment, the communication component 416 further includes a near field communication (NFC) module to facilitate short-range communications. For example, the NFC module may be implemented based on the radio frequency identification (RFID) technology, infrared data association (IrDA) technology, ultra-wideband (UWB) technology, Bluetooth (BT) technology, and other technologies.

In exemplary embodiments, the device 400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, and is used to perform the above mobility measurement method provided by the embodiment of FIG. 1B or FIG. 2.

In exemplary embodiments, there is also provided a non-transitory computer-readable storage medium including an instruction, such as the memory 404 including the instruction which is executable by the processor 420 in the device 400 to perform the above-described method. For example, the non-transitory computer-readable storage medium may be an ROM, a RAM, a CD-ROM, a magnetic tape, a floppy disc, optical data storage equipment, and the like.

There is provided a non-transitory computer-readable storage medium. When the instruction in the storage medium is executed by the processor in a mobile terminal, the mobile terminal can perform a mobility measurement method which includes:

receiving system information sent by a first base station, wherein the system information includes information of a first reference signal and information of a second reference signal, the first reference signal is a reference signal configured by the first base station for a current cell, the current cell is a cell currently accessed by a user equipment, the second reference signal is a reference signal configured by a second base station for a neighbor cell of the current cell, and the first base station is a base station corresponding to the current cell, and the second base station is a base station corresponding to the neighbor cell; and measuring mobility of the current cell based on a reference signal in a synchronization block of the current cell and the first reference signal according to the information of the first reference signal, and measuring mobility of the neighbor cell based on a reference signal in a synchronization block of the neighbor cell and the second reference signal according to the information of the second reference signal.

In some embodiments, the information of the first reference signal includes first initial position information, first end position information and a first density number. The first initial position information is used to determine an initial position of the first reference signal on a time frequency of the current cell. The first end position information is used to determine an end position of the first reference signal on the time frequency of the current cell. The first density number is used to determine a density of the first reference signal on the time frequency of the current cell.

The information of the second reference signal includes second initial position information, second end position information and a second density number. The second initial position information is used to determine an initial position of the second reference signal on a time frequency of the neighbor cell. The second end position information is used to determine an end position of the second reference signal on the time frequency of the neighbor cell. The second density number is used to determine a density of the second reference signal on the time frequency of the neighbor cell.

In some embodiments, the information of the first reference signal includes a first format number used to determine a distribution format of the first reference signal on the time frequency of the current cell; and the information of the second reference signal includes a second format number used to determine a distribution format of the second reference signal on the time frequency of the neighbor cell.

In some embodiments, measuring the mobility of the current cell based on the reference signal in the synchronization block of the current cell and the first reference signal according to the information of the first reference signal and measuring the mobility of the neighbor cell based on the reference signal in the synchronization block of the neighbor cell and the second reference signal according to the information of the second reference signal include:

measuring mobility of the reference signal in the synchronization block of the current cell and mobility of the first reference signal respectively according to the information of the first reference signal to obtain a first measurement result and a second measurement result, and measuring mobility of the reference signal in the synchronization block of the neighbor cell and mobility of the second reference signal respectively according to the information of the second reference signal to obtain a third measurement result and a fourth measurement result; and determining a result obtained by performing moving average processing on the first measurement result and the second measurement result as a mobility measurement result of the current cell, and determining a result obtained by performing moving average processing on the third measurement result and the fourth measurement result as a mobility measurement result of the neighbor cell.

In some embodiments, after measuring the mobility of the current cell based on the reference signal in the synchronization block of the current cell and the first reference signal according to the information of the first reference signal, the method further includes:

in a case that the system information further includes an update message of the current cell and the update message includes a first update time and information of an updated first reference signal, when the first update time is reached, measuring the mobility of the current cell based on the reference signal in the synchronization block of the current cell and the updated first reference signal according to the information of the updated first reference signal;

performing moving average processing on a mobility measurement result determined within a first preset time period prior to and close to the first update time and a mobility measurement result determined when the first update time is reached; and determining a result obtained after the moving average processing as the mobility measurement result of the current cell.

In some embodiments, after measuring the mobility of the neighbor cell based on the reference signal in the synchronization block of the neighbor cell and the second reference signal according to the information of the second reference signal, the method further includes:

in a case that the system information further includes an update message of the neighbor cell and the update message includes a second update time and information of an updated second reference signal, when the second update time is reached, measuring the mobility of the neighbor cell based on the reference signal in the synchronization block of the neighbor cell and the updated second reference signal according to the information of the updated second reference signal;

performing moving average processing on a mobility measurement result determined within a second preset time period prior to and close to the second update time and a mobility measurement result determined when the second update time is reached; and determining a result obtained after the moving average processing as the mobility measurement result of the neighbor cell.

The beneficial effects of the technical solutions provided by the embodiments of the present disclosure are as follows.

System information sent by a first base station is received, wherein the system information includes information of a reference signal configured by the first base station for a current cell and information of a reference signal configured by a second base station for a neighbor cell of the current cell. Mobility of the current cell is measured based on a reference signal in a synchronization block of the current cell and the first reference signal according to the information of the first reference signal, so that a problem of inaccurate mobility measurement caused by lower density of the reference signal in the synchronization block of the current cell is avoided. In addition, similarly, mobility of the neighbor cell is measured based on a reference signal in a synchronization block of the neighbor cell and the second reference signal according to the information of the second reference signal, so that a problem of inaccurate mobility measurement caused by lower density of the reference signal in the synchronization block of the neighbor cell is avoided. That is, the accuracy in the mobility measurement can be improved according to various embodiments of the present disclosure.

In the present disclosure, it is to be understood that the terms "lower," "upper," "front," "back," "left," "right," "top," "bottom," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect through an intermediate medium, unless otherwise explicitly stated and defined.

In the description of the present disclosure, the terms "some embodiments," "example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the methods and operations can be provided in a form of a non-transitory computer-readable storage medium having instructions stored thereon is further provided. For example, the non-transitory computer-readable storage medium may be a Read-Only Memory (ROM), a Random-Access Memory (RAM), a Compact Disc Read-Only Memory (CD-ROM), a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A mobility measurement method performed by a user equipment (UE), comprising:
receiving system information from a first base station, wherein the system information comprises information of a first reference signal and information of a second reference signal, the first reference signal is a reference signal configured by the first base station for a current cell, the current cell is a cell accessed currently, the second reference signal is a reference signal configured by a second base station for a neighbor cell of the current cell, the first base station is a base station corresponding to the current cell, and the second base station is a base station corresponding to the neighbor cell;
measuring mobility of the current cell based on a reference signal in a synchronization block of the current cell and the first reference signal according to the information of the first reference signal; and
measuring mobility of the neighbor cell based on a reference signal in a synchronization block of the neighbor cell and the second reference signal according to the information of the second reference signal,
wherein after measuring the mobility of the current cell based on the reference signal in the synchronization block of the current cell and the first reference signal according to the information of the first reference signal, the method further comprises:
in a case that the system information further comprises an update message of the current cell and the update message comprises a first update time and information of an updated first reference signal, when the first update time is reached, measuring the mobility of the current cell based on the reference signal in the synchronization block of the current cell and the updated first reference signal according to the information of the updated first reference signal;
performing moving average processing on a mobility measurement result determined within a first preset time period prior to the first update time and a mobility measurement result determined when the first update time is reached; and
determining a result obtained after the moving average processing as the mobility measurement result of the current cell.

2. The method of claim 1, wherein the information of the first reference signal comprises first initial position information, first end position information and a first density number, the first initial position information is configured to determine an initial position of the first reference signal on a time frequency of the current cell, the first end position information is configured to determine an end position of the first reference signal on the time frequency of the current cell, and the first density number is configured to determine a density of the first reference signal on the time frequency of the current cell; and
the information of the second reference signal comprises second initial position information, second end position information and a second density number, the second initial position information is configured to determine an initial position of the second reference signal on a time frequency of the neighbor cell, the second end position information is configured to determine an end position of the second reference signal on the time frequency of the neighbor cell, and the second density number is configured to determine a density of the second reference signal on the time frequency of the neighbor cell.

3. The method of claim 1, wherein the information of the first reference signal comprises a first format number configured to determine a distribution format of the first reference signal on the time frequency of the current cell; and the information of the second reference signal comprises a second format number configured to determine a distribution format of the second reference signal on the time frequency of the neighbor cell.

4. The method of claim 1, wherein the measuring mobility of the current cell based on a reference signal in a synchronization block of the current cell and the first reference signal according to the information of the first reference signal, and measuring mobility of the neighbor cell based on a reference signal in a synchronization block of the neighbor cell and the second reference signal according to the information of the second reference signal, comprise:
obtaining a first measurement result by measuring the mobility of the reference signal in the synchronization block of the current cell and a second measurement result by measuring the mobility of the first reference signal according to the information of the first reference signal;
obtaining a third measurement result by measuring the mobility of the reference signal in the synchronization block of the neighbor cell and a fourth measurement result by measuring the mobility of the second reference signal according to the information of the second reference signal;
obtaining a mobility measurement result of the current cell by performing moving average processing on the first measurement result and the second measurement result; and
obtaining a mobility measurement result of the neighbor cell by performing moving average processing on the third measurement result and the fourth measurement result.

5. A mobility measurement method performed by a terminal device, comprising:
receiving system information from a first base station, wherein the system information comprises information of a first reference signal and information of a second reference signal, the first reference signal is a reference signal configured by the first base station for a current cell, the current cell is a cell accessed currently, the second reference signal is a reference signal configured by a second base station for a neighbor cell of the current cell, the first base station is a base station corresponding to the current cell, and the second base station is a base station corresponding to the neighbor cell;
measuring mobility of the current cell based on a reference signal in a synchronization block of the current cell and the first reference signal according to the information of the first reference signal; and
measuring mobility of the neighbor cell based on a reference signal in a synchronization block of the neighbor cell and the second reference signal according to the information of the second reference signal,
wherein after measuring the mobility of the neighbor cell based on the reference signal in the synchronization block of the neighbor cell and the second reference signal according to the information of the second reference signal, the method further comprises:
in a case that the system information further comprises an update message of the neighbor cell and the update message comprises a second update time and information of an updated second reference signal, when the second update time is reached, measuring the mobility of the neighbor cell based on the reference signal in the synchronization block of the neighbor cell and the updated second reference signal according to the information of the updated second reference signal;
performing moving average processing on a mobility measurement result determined within a second preset time period prior to the second update time and a mobility measurement result determined when the second update time is reached; and
determining a result obtained after the moving average processing as the mobility measurement result of the neighbor cell.

6. The method of claim 1, wherein a density of the first reference signal is set according to an actual operating environment.

7. The method of claim 6, wherein the density is set according to three cases: in a densely populated urban area, the density of the first reference signal is set to be one-half to avoid interference, wherein one of every two resource elements (REs) is the first reference signal; in a non-densely populated urban area, the density is set to be one-third, wherein one of every three REs is the first reference signal; and in an open area of a suburb, the density is set to be one-sixth, where one of every six REs is the first reference signal.

8. The method of claim 7, wherein the information of the first reference signal includes a first initial position information, a second end position information, and a first density number, to thereby determine a position of the first reference signal in the REs.

9. The method of claim 8, wherein an initial position of the first reference signal on a time frequency is determined according to the first initial position information; an end position of the first reference signal on the time frequency is determined according to the second end position information; and a density of the first reference signal on the time frequency is determined according to the first density number, thereby determining distribution positions and distribution rule of the first reference signal in the REs, such that the position of the first reference signal in the REs of the current cell is determined.

10. The method of claim 3, further comprising pre-negotiating, between the first base station and the user equipment (UE), a corresponding relationship between first format numbers and corresponding formats, such that the UE determines a distribution format of the first reference signal on the time frequency of the current cell according to the corresponding first format number, wherein the distribution format directly represents a distribution position and a distribution rule of the first reference signal on the time frequency of the current cell.

11. The method of claim 10, wherein a time for the first base station to send the first reference signal is synchronous to a time to send the synchronization block of the current cell to enable the UE measure the mobility of the reference signal in the synchronization block of the current cell and the first reference signal respectively; and for the current cell, the mobility is measured both based on the reference signal in the synchronization block of the current cell, and based on the first reference signal configured by the first base station.

12. A mobility measurement device, comprising:
a processor; and
a memory, configured to store instructions that, when executed by the processor, cause the mobility measurement device to perform actions including:
receiving system information from a first base station, wherein the system information comprises information of a first reference signal and information of a second reference signal, the first reference signal is a reference signal configured by the first base station for a current cell, the current cell is a cell accessed currently, the second reference signal is a reference signal configured by a second base station for a neighbor cell of the current cell, the first base station is a base station corresponding to the current cell, and the second base station is a base station corresponding to the neighbor cell;
measuring mobility of the current cell based on a reference signal in a synchronization block of the current cell and the first reference signal according to the information of the first reference signal; and
measuring mobility of the neighbor cell based on a reference signal in a synchronization block of the neighbor cell and the second reference signal according to the information of the second reference signal, wherein the measuring mobility of the current cell based on a reference signal in a synchronization block of the current cell and the first reference signal according to the information of the first reference signal, and measuring mobility of the neighbor cell based on a reference signal in a synchronization block of the neighbor cell and the second reference signal according to the information of the second reference signal, comprise:
- obtaining a first measurement result by measuring the mobility of the reference signal in the synchronization block of the current cell and a second measurement result by measuring the mobility of the first reference signal according to the information of the first reference signal;
- obtaining a third measurement result by measuring the mobility of the reference signal in the synchronization block of the neighbor cell and a fourth measurement result by measuring the mobility of the second reference signal according to the information of the second reference signal;
- obtaining a mobility measurement result of the current cell by performing moving average processing on the first measurement result and the second measurement result; and
- obtaining a mobility measurement result of the neighbor cell by performing moving average processing on the third measurement result and the fourth measurement result.

13. The device of claim 12, wherein:
- the information of the first reference signal comprises first initial position information, first end position information and a first density number, the first initial position information is configured to determine an initial position of the first reference signal on a time frequency of the current cell, the first end position information is configured to determine an end position of the first reference signal on the time frequency of the current cell, and the first density number is configured to determine a density of the first reference signal on the time frequency of the current cell; and
- the information of the second reference signal comprises second initial position information, second end position information and a second density number, the second initial position information is configured to determine an initial position of the second reference signal on a time frequency of the neighbor cell, the second end position information is configured to determine an end position of the second reference signal on the time frequency of the neighbor cell, and the second density number is configured to determine a density of the second reference signal on the time frequency of the neighbor cell.

14. The device of claim 12, wherein the information of the first reference signal comprises a first format number configured to determine a distribution format of the first reference signal on the time frequency of the current cell; and the information of the second reference signal comprises a second format number configured to determine a distribution format of the second reference signal on the time frequency of the neighbor cell.

15. The device of claim 12, wherein after measuring mobility of the current cell based on a reference signal in a synchronization block of the current cell and the first reference signal according to the information of the first reference signal, the actions further include:
- in a case that the system information further comprises an update message of the current cell and the update message comprises a first update time and information of an updated first reference signal, when the first update time is reached, measuring the mobility of the current cell based on the reference signal in the synchronization block of the current cell and the updated first reference signal according to the information of the updated first reference signal;
- performing moving average processing on a mobility measurement result determined within a first preset time period prior to the first update time and a mobility measurement result determined when the first update time is reached; and
- determining a result obtained after the moving average processing as the mobility measurement result of the current cell.

16. The device of claim 12, wherein after measuring the mobility of the neighbor cell based on the reference signal in the synchronization block of the neighbor cell and the second reference signal according to the information of the second reference signal, the actions further include:
- in a case that the system information further comprises an update message of the neighbor cell and the update message comprises a second update time and information of an updated second reference signal, when the second update time is reached, measuring the mobility of the neighbor cell based on the reference signal in the synchronization block of the neighbor cell and the updated second reference signal according to the information of the updated second reference signal;
- performing moving average processing on a mobility measurement result determined within a second preset time period prior to the second update time and a mobility measurement result determined when the second update time is reached; and
- determining a result obtained after the moving average processing as the mobility measurement result of the neighbor cell.

* * * * *